United States Patent [19]

Kanai

[11] Patent Number: 5,170,454
[45] Date of Patent: Dec. 8, 1992

[54] OPTICAL CONNECTOR FOR ENDOSCOPE

[75] Inventor: Gen-ichi Kanai, Matsudo, Japan

[73] Assignee: Kabushiki Kaisha Machida Seisakusho, Tokyo, Japan

[21] Appl. No.: 784,107

[22] Filed: Oct. 29, 1991

Related U.S. Application Data

[63] Continuation of Ser. No. 500,491, Mar. 28, 1990, abandoned.

[30] Foreign Application Priority Data

Apr. 13, 1989 [JP] Japan ................................. 1-42531

[51] Int. Cl.⁵ .............................................. G02B 6/36
[52] U.S. Cl. ........................................ 385/88; 385/58; 385/77; 385/117; 385/93
[58] Field of Search .............. 350/96.18, 96.20, 96.26; 385/58, 60, 63, 70, 77, 88, 93

[56] References Cited

U.S. PATENT DOCUMENTS

| | | | |
|---|---|---|---|
| 3,710,091 | 1/1973 | Holcomb | 350/96.18 |
| 3,724,383 | 4/1973 | Gallaghan et al. | 350/96.18 |
| 4,222,375 | 9/1980 | Martinez. | |
| 4,307,934 | 12/1981 | Palmer | 350/96.18 |
| 4,576,435 | 3/1986 | Nishioka | 385/123 X |
| 4,799,754 | 1/1989 | Goldenberg | 350/96.26 |
| 4,807,958 | 2/1989 | Gunner et al. | 350/96.18 |
| 4,846,544 | 7/1989 | Bortolin et al. | 350/96.18 |
| 4,850,669 | 7/1989 | Welker et al. | 350/96.18 |

FOREIGN PATENT DOCUMENTS

| | | |
|---|---|---|
| 0061748 | 10/1982 | European Pat. Off. . |
| 0082691 | 6/1983 | European Pat. Off. . |
| 3607936 | 9/1987 | Fed. Rep. of Germany . |
| 8706844.3 | 9/1988 | Fed. Rep. of Germany . |
| 2190764 | 11/1987 | United Kingdom . |

Primary Examiner—John D. Lee
Assistant Examiner—S. W. Barns
Attorney, Agent, or Firm—Fish & Richardson

[57] ABSTRACT

There is disclosed an optical connector for connecting an endoscope to a light source device. The connector includes an elongated connector body for receiving and holding one end portion of a light guide of the endoscope. The connector body has a port at its one end, and the convex lens is supported at this port. The connector is attached to the light source device, and in this condition an illumination light converging from a light source toward one end of the connector passes through the convex lens and is incident upon a light-receiving surface of the light guide.

10 Claims, 2 Drawing Sheets

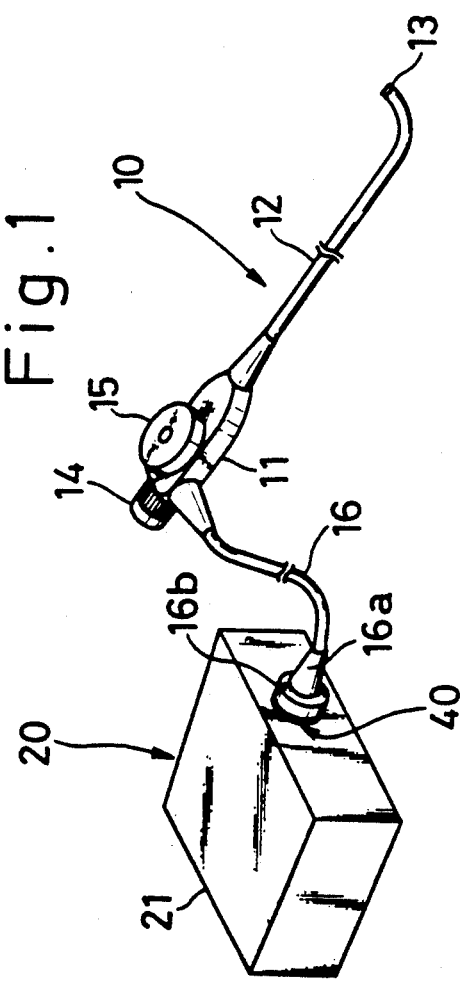
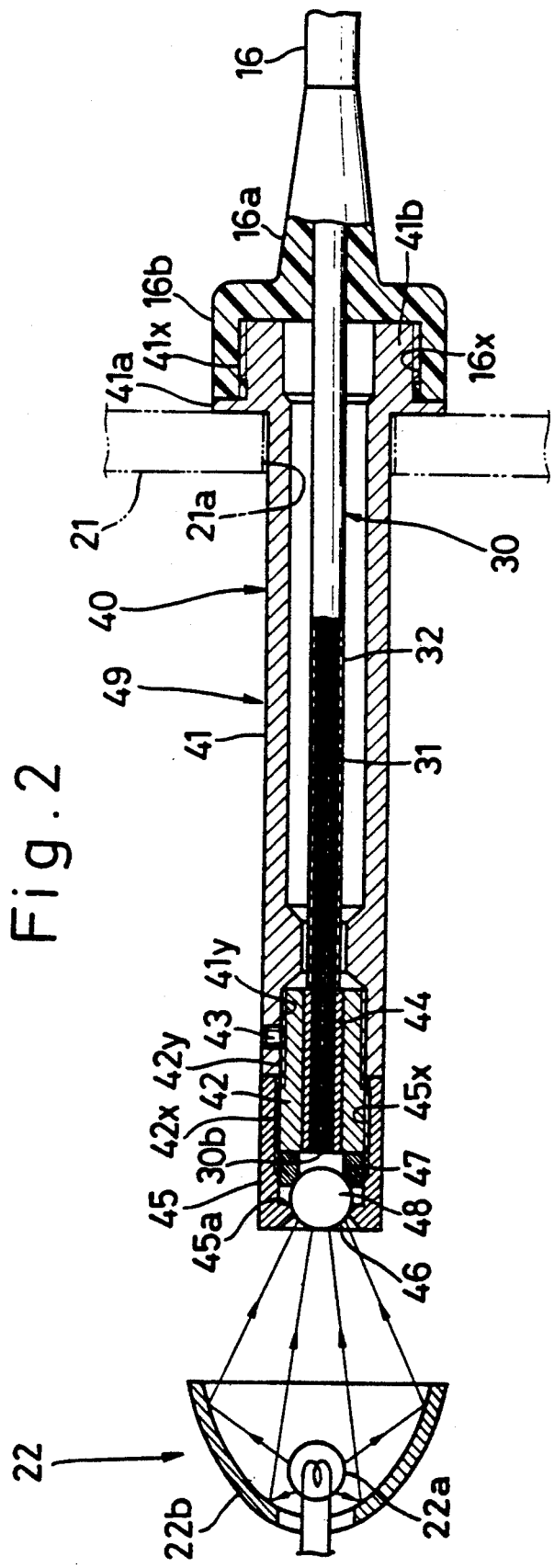
Fig. 1
Fig. 2

OPTICAL CONNECTOR FOR ENDOSCOPE

This application is a continuation of U.S. application Ser. No. 07/500,491, filed Mar. 28, 1990, now abandoned.

BACKGROUND OF THE INVENTION

This invention relates to an optical Connector for an endoscope.

An endoscope system, as disclosed in Japanese Laid-Oppen (Kokai) Patent Application Nos. 47014/81 and 4015/86 and Japanese Patent Publication No. 53525/88, comprises, as main components, an endoscope and a light source device optically connected together.

The endoscope comprises, for example, a manipulation body, a flexible insertion portion extending forwardly from the manipulation body, a rigid portion mounted on the distal end of the insertion portion, and a flexible cable extending laterally from the manipulation body. An optical connector of a cylindrical shape is mounted on the distal end of the cable. The endoscope further comprises a light guide having a bundle of optical fibers. One end face of the light guide serves as a light-emitting surface, and is optically connected to an illumination window provided at the rigid portion of the endoscope. The light guide passes through the insertion portion, the manipulation body and the cable and is fixedly fitted in the cylindrical connector. The other end face of the light guide serves as a light-receiving surface, and is disposed at or near a port or opening of the cylindrical connector provided at the distal end thereof. The fixing of the connector to the light guide is described in detail in the above Japanese Laid-Open Patent Application No. 47014/81.

The light source device comprises a housing, and a light source accommodated within the housing. The light source generates a convergent illumination light, and usually comprises a lamp and a concave mirror.

The connector is inserted into the housing of the light source device, and in this inserted condition, the distal end of the connector is disposed in opposed relation to the light source. The illumination light from the light source is incident upon the light receiving surface of the light guide, and passes through the light guide, and this illumination light further goes out of the light-emitting surface of the light guide and passes through the illumination window into a body cavity.

In order to observe the body cavity over a wide range, it is desired that the outgoing illumination light be emitted at a wide angle from the illumination window of the endoscope.

To achieve this, the following procedures have conventionally been employed.

First, the light source has been designed for the above purpose. More specifically, the light source as disclosed in the above Japanese Laid-Open Patent Application No. 47014/81 includes a convex lens in addition to the lamp and the concave mirror, so that the angle of convergence of the illumination light generated from the light source is widened or increased, thereby widening the angle of the illumination light incident on the light receiving surface of the light guide. The angle of the outgoing illumination light from the light-emitting surface of the light guide is equal to the angle of the illumination light incident on the light-receiving surface of the light guide. Therefore, by widening the angle of the incident light, the angle of the outgoing light can be widened as described above. However, this arrangement has a disadvantage that the light source device becomes bulky or large-sized.

Secondly, as disclosed in Japanese Laid-Open Patent Application No. 130134/81, a concave lens is disposed between the illumination window and the light-emitting surface of the light guide, thereby further widening the angle of the outgoing illumination light from the light-emitting surface of the light guide. However, this results in a problem that the rigid portion connected to the distal end of the insertion portion becomes complicated and bulky in construction.

SUMMARY OF THE INVENTION

It is therefore an object of this invention to provide an optical connector for an endoscope by which the angle of an outgoing illumination light emitted from a light guide is increased to thereby widen the range of illumination of the endoscope, without increasing the size of a light source device and also without making complicated and bulky the distal end portion of an insertion portion of the endoscope.

According to the present invention, there is provided an optical connector for optically connecting an endoscope to a light source device, the endoscope having light guide means for transmitting an illumination light, the light guide means having a bundle of optical fibers and having one end face serving as a light-emitting surface optically connected to an illumination window of the endoscope, the light source device including a housing, and a light source mounted within the housing so as to generate a convergent illumination light, the optical connector comprising:

(a) an elongated hollow connector body insertable into the housing of the light source device, so that one end of the connector body is disposed in opposed relation to the light source, the connector body having a port at the one end thereof, an end portion of the light guide means remote from the illumination window being adapted to be received in and supported by the connector body, so that the other end face of the light guide means is disposed in spaced, opposed relation to the port of the connector body so as to serve as a light-receiving surface; and (b) a convex lens supported at the port of the connector body, the illumination light from the light source being adapted to be incident upon the light-receiving surface of the light guide means through the convex lens when the connector body is inserted in the light source device.

BRIEF DESCRIPTION OF THE DRAWINGS

FIG. 1 is a perspective view of an endoscope system incorporating an optical connector of the present invention optically collecting an endoscope to a light source device;

FIG. 2 is a cross-sectional view of the optical connector;

DESCRIPTION OF THE PREFERRED EMBODIMENT OF THE INVENTION

Figure 3:
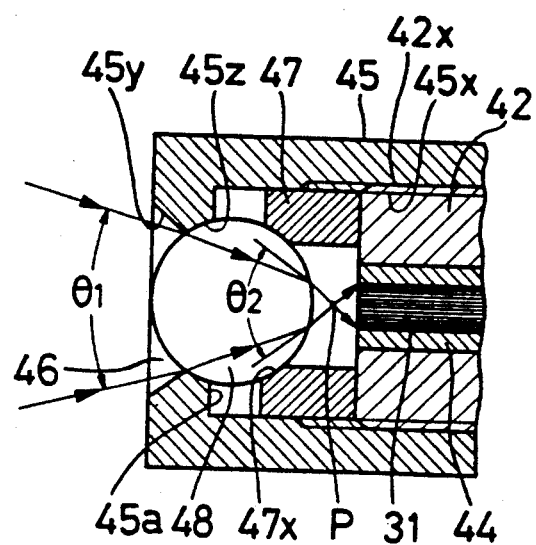
FIG. 3 is a cross-sectional view of an important portion of the optical connector.

The invention will now be described with reference to the drawings.

An endoscope system shown in FIG. 1 comprises an endoscope 10 and a light source device 20.

The endoscope 10 comprises a manipulation body 11, a flexible insertion portion 12 extending from a front end of the manipulation body 11, a rigid portion 13 mounted on the distal end of the insertion portion 12, an ocular portion 14 mounted on the rear end of the manipulation body 11, a manipulation dial 15 mounted on one side of the manipulation body 11 so as to manipulate or bend the distal end portion of the insertion portion 12, and a flexible hollow cable 16 of a resin extending laterally from the manipulation body 11. The rigid portion 13 has an inspection window (not shown) and an illumination window 13a (see FIG. 4). The inspection window is connected to the ocular portion 14 via an image-transmitting optical system including a bundle of optical fibers.

The above construction is well known in the art, and does not constitute the subject matter of the present invention, and therefore a detailed description thereof will be omitted here. Instead of the above-mentioned endoscope, there can be used other types of endoscopes, for example, having a rigid insertion portion or having an image sensor mounted on the rigid portion on the distal end of the flexible insertion portion.

Figure 4:
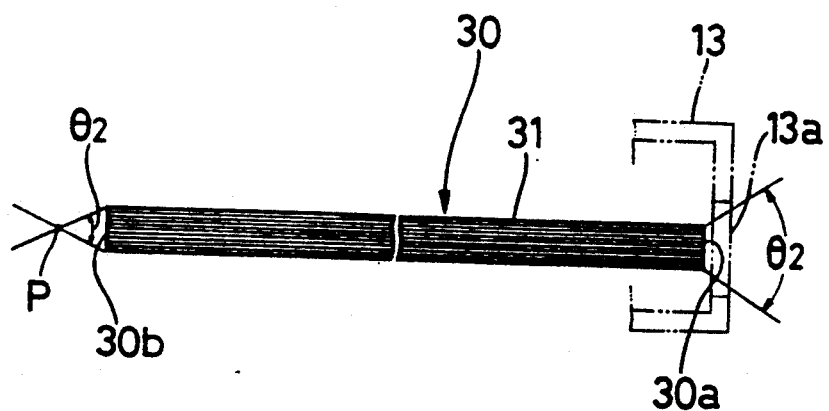
FIG. 4 is a view illustrative of the operation of a light guide.

As shown in FIG. 2, the endoscope 10 further includes a light guide 30. The light guide 30 comprises a tube 32 of a resin, and a bundle 31 of optical fibers received in the tube 32. As shown in FIG. 4, one end face 30a of the light guide 30 serves as a light-emitting surface, and is disposed in opposed relation to the illumination window 13a of the rigid portion 13. In other words, the light-emitting surface 30a is optically connected to the illumination window 13a. The light guide 30 extends from a position adjacent to the illumination window 13a, and passes through the insertion portion 12, the manipulation body 11 and the cable 16, and is fixedly fitted in a connector 40 at the end thereof remote from the illumination window 13a, as shown in FIG. 2.

The distal end portion of the cable 16 remote from the manipulation body 11, as well as the connecter 40 for connection to this distal end portion, will now be described in detail. The distal end portion of the cable 16 has a tapered reinforcement portion 16a increasing in thickness progressively toward the distal end of the cable 16, and a connective portion 16b of a tubular shape formed on the distal end of the reinforcement portion 16a. A threaded portion 16x is formed on the inner peripheral surface of the connective portion 16b.

The connector 40 comprises a straight rigid cylindrical member 41 of a hollow construction. The cylindrical member 41 has a positioning flange 41a at its proximal end portion, and a tubular connective portion 41b extending rearwardly from the flange 41a. A threaded portion 41x is formed on the outer peripheral surface of the connective portion 41b. Connection between the connective portion 41b of the cylindrical member 41 and the connective portion 16b of the cable 16 is made by a threaded engagement between the threaded portion 41× and the threaded portion 16×.

The connector 40 further comprises an auxiliary cylindrical member 42 of a hollow construction. Two threaded portions 42× and 42y are formed on the outer peripheral surface of the auxiliary cylindrical member 42, and are arranged adjacent to each other along the length of the auxiliary cylindrical member 42. The threaded portion 42y of the auxiliary cylindrical member 42 is threadedly engaged with a threaded portion 41y formed on the inner peripheral surface of the forward end portion of the cylindrical member 41, so that the auxiliary cylindrical member 42 is connected to the cylindrical member 41 in coaxial relation thereto. This connected condition is positively maintained by a fastening screw 43 threaded in the peripheral wall of the cylindrical member 41 and pressed against the outer peripheral surface of the auxiliary cylindrical member 42.

The light guide 30 is fixedly secured to the inner peripheral surface of the auxiliary cylindrical member 42. More specifically, one end portion of the tube 32 of the light guide 30 has been removed over a length substantially equal to the length of the auxiliary cylindrical member 42 to thereby expose one end portion of the optical fiber bundle 31. The thus exposed one end portion of the optical fiber bundle 31 is inserted in a reinforcement tube 44, and is fixedly secured thereto by an adhesive. The optical fibers of the bundle 31 are also fixed together by an adhesive. The reinforcement tube 44 is inserted in the auxiliary cylindrical member 42, and is fixedly secured to the inner peripheral surface thereof by an adhesive or the like, so that the end portion of the light guide 30 remote from the rigid portion 13 is fixed to the auxiliary cylindrical portion 42 in coaxial relation thereto. The other end face 30b of the light guide 30 is disposed flush with the distal end face of the auxiliary cylindrical member 42, and serves as a light-receiving surface.

The connector 40 further comprises a retainer tube 45. A threaded portion 45× is formed on the inner peripheral surface of the retainer tube 45 at its proximal end portion. The threaded portion 45× is threaded on the threaded portion 42× of the auxiliary cylindrical member 42 projecting beyond the distal end of the cylindrical member 41, so that the retainer tube 45 is connected to the auxiliary cylindrical member 42 in coaxial relation thereto. As best shown in FIG. 3, a radially inwardly-directed flange 45a of an annular shape is formed on the distal end of the retainer tube 45. The connector 40 has a port or opening 46 defined by the inner periphery of the annular flange 45a. A semi-spherical seat 45z is formed on the inward portion of the inner periphery of the flange 45a close to the auxiliary cylindrical member 42. A tapered surface 45y is formed on the outward portion of the inner periphery of the flange 45a remote from the auxiliary cylindricla member 42, the tapered surface 45y increasing in diameter progressively in a direction away from the semi-spherical seat 45z. Thus, the port 46 of the connector 40 is defined by the semi-spherical seat 45z and the tapered surface 45y. The light-receiving surface 30b of the light guide 30 is disposed in spaced, opposed relation to the port 46.

The connector 40 further comprises a ring-shaped spacer 47. The spacer 47 is received within the retainer tube 45 and is held at one end against the distal end of the auxiliary cylindrical member 42. A semi-spherical seat 47× is formed on the inner peripheral edge of the other end of the spacer 47 remote from the auxiliary Oylindrical member 42.

The cylindrical member 41, the auxiliary cylindrical member 42, the reinforcement tube 44, the retainer tube 45 and the spacer 47 jointly constitute a connector body 49.

The connector 40 further comprises a spherical lens (conve× lens) 48. The spherical lens 48 and the spacer 47 are received within the retainer tube 45, and in this condition the retainer tube 45 is threadedly connected to the auxiliary cylindrical member 42, so that the spherical lens 48 is firmly held against and supported by the semi-spherical seat 45z of the retainer tube 45 and the semi-spherical seat 47X of the spacer 47. In this supported condition, the axes or centerlines of the semi-spherical seats 45z and 47X as well as the center of the spherical lens 48 are aligned with the axes of the connector body 49 and light guide 30. Also, in this supported condition, the spherical lens 48 is disposed in spaced, opposed relation to the light-receiving surface 30b of the light guide 30.

The light source device 20 comprises a housing 21, and a light source 22 mounted at a predetermined position within the housing 21. The housing 21 has an insertion hole 21a for the insertion of the connector 40 therethrough into the housing 21, and a guide means (not shown) provided adjacent to the insertion hole 21a so as to guide the insertion of the connector 40. The light source 22 comprises a lamp 22a, and a concave mirror 22b for converging an illumination light generated from the lamp 22a.

The connector 40 is inserted into the housing 21 of the light source device 20 through the insertion hole 21a, with the flange 41a of the connector 40 held against the side surface of the housing 21. In this condition, the distal end of the connector 40 is disposed in opposed relation to the light source 22. Also, in this condition, the axis or centerline of the connector 40 is aligned with the optical axis of the illumination light generated from the light source 22.

The operation of the connector 40 of the above construction will now be described. The convergent illumination light generated from the light source 22 is incident upon the spherical lens 48 at an angle θ1, so that this illumination light is converged at a greater angle θ2 through the convergent action of the spherical lens 48. The illumination light, emitted from the spherical lens 48, converges into a point P disposed between the spherical lens 48 and the light guide 30, and then diverges at an angle equal to the above angle θ2, and then is incident upon the light-receiving surface 30b of the light guide 30. As a result, the angle of the outgoing illumination light emitted from the light-emitting surface 30a of the light guide 30 is equal to the above angle θ2. Thus, the angle of the outgoing illumination light from the light-emitting surface 30a can be equal to the angle θ2 which is greater or wider than the angle θ1 of the illumination light applied from the light source 22 to the spherical lens 48. Therefore, the range of illumination of the endoscope and the observation range can be widened. For example, if the angle θ1 of the illumination light applied from the light source 22 to the conveX lens 48 is 60°, the angle θ2 of the outgoing illumination light emitted from the light guide 30 can be 80°. Recently, there have been developed optical fibers of the type capable of properly transmitting light even if the angle of the light incident upon such optical fibers is equal to or more than 80°. Therefore, with the above arrangement of the present invention, the illumination light can be transmitted satisfactorily.

Thus, even when there is used the light source for generating the illumination light at a relatively small convergence angle as described above, the illumination range can be widened. When there is used the type of light source for generating an illumination light at a relatively large convergence angle, the illumination range can be further widened.

In this embodiment, since the spherical lens 48 is used, the connector 40 can be manufactured at lower costs. The center of the spherical lens 48 only need to be aligned with the optical axis of the light source 22 and the axis of the light guide 30. Therefore, the adjustment of the spherical lens 48 is easier than that of an ordinary conveX lens when bringing the optical axis thereof into alignment with the optical axis of the light source 22 and the axis of the light guide 30. Thus, despite the fact that the spherical lens 48 is to be mounted within the connector 40 of a small diameter, the assemblage can be made easily.

The adjustments of the positions of the spherical lens 48 and the light-receiving surface 30b of the light guide 30 relative to the light source 22 will now be described in detail. By adjusting the amount of threading of the auxiliary cylindrical member 42 into the cylindrical member 41, the distance or length between the positioning flange 41a and the light-receiving surface 30b of the light guide 30 can be adjusted, and at the same time the distance between the light-receiving surface 30b of the light guide 30 and the light source 22 when the connector 40 is inserted into the housing 21 can be adjusted. Further, by suitably determining the axial length of the spacer 47 and mounting the spacer 47 within the retainer tube 45, the distance between the spherical lens 48 and the light-receiving surface 30b of the light guide 30 as well as the distance between the spherical lens 48 and the light source 22 when the connector 40 is inserted into the housing 21 can be adjusted. By the above adjustments, all of the illumination light converging into the point P through the spherical lens 48 can be applied to the entire area of the light-receiving surface 30b of the light guide 30.

In this embodiment, by removing the retainer tube 45 from the auxiliary cylindrical member 42, the spherical lens 48 and the spacer 47 can be removed together with the retainer tube 45. In this condition, the illumination light generated from the light source 22 is directly incident upon the light-receiving surface 30b of the light guide 30. Therefore, with this arrangement, the connector 40 can be also used where the light source of the light source device generates an illumination light at a greater convergence angle.

The cable 16 shown in FIG. 1 may be detachably connected to the manipulation body 11. In this case, there is used a light guide means which comprises two light guides one of which is inserted into the cable 16 and the connector 40 whereas the other light guide is inserted into the manipulation body 11 and the insertion portion 12. The two light guides are optically connected together at their one ends.

As the conveX lens, there can, of course, be used other lens than the spherical lens, such as a biconveX (double convex) lens and a conveX meniscus lens.

The light-receiving surface of the light guide may be disposed between the convex lens and an expected convergent point of the illumination light converged through the convex lens. In this case, if the convergent angle is represented by θ2, the illumination light can be incident upon and distributed to the light-receiving surface in a manner similar to that described above for the incident illumination light diverging from the point P as shown in FIG. 4.

While the invention has been specifically described and shown with reference to the above embodiment, the invention itself is not to be restricted thereto, and various modification can be made.

What is claimed is:

1. An endoscope system comprising:
   (a) an endoscope having light guide means for transmitting an illumination light, the light guide means having a bundle of optical fibers and having one end face serving as a light-emitting surface optically connected to an illumination window of the endoscope;
   (b) a light source device including a housing and a light source mounted within the housing so as to generate a convergent illumination light; and
   (c) an optical connector for optically connecting said endoscope to said light source device, said optical connector comprising:
   (i) an elongated hollow connector body insertable into the housing of the light source device so that one end of said connector body is disposed in an opposed relation to the light source, said connector body having a port at the one end thereof, an end portion of the light guide means remote from the illumination window being adapted to be received in and supported by said connector body so that the other end face of the light guide means is disposed in spaced, opposed relation to said port of said connector body so as to serve as a light-receiving surface; and
   (ii) a convex lens supported at the one end of said connector body to close said port, said convex lens being disposed in directly opposed relation to the light source, and the convergent illumination light from the light source being adapted to be incident upon said convex lens when said connector body is inserted in the light source device, and the illumination light from said convex lens being incident upon the light-receiving surface of the light guide means.

2. An endoscope system according to claim 1, in which said convex lens has a spherical shape.

3. An endoscope system according to claim 1, in which said convex lens is spaced apart from the light-receiving surface of the light guide means, a convergent point into which the illumination light going from said convex lens toward the light-receiving surface of the light guide means converges being disposed between said convex lens and the light-receiving surface of the light guide means, and the illumination light diverging from said convergent point toward the light-receiving surface of the light guide means.

4. An endoscope system according to claim 1, in which said connector body comprises:
   (i) a main hollow cylindrical member through which said end portion of the light guide means remote from the illumination window extends;
   (ii) an auxiliary hollow cylindrical member coaxially threaded at its proximal end portion to a distal end portion of asid main cylindricla member, the end portion of the light guide means remote from the illumination window being fixedly fitted in said auxiliary cylindrical member, the light-receiving surface of the light guide means being flush with a distal end face of said auxiliary cylindrical member;
   (iii) a retainer tube threaded at a proximal end portion on an outer peripheral surface of a distal end portion of said auxiliary cylindrical member, said retainer tube having a radially inwardly-directed flange formed on a distal end thereof remote from said auxiliary cylindrical member, and an inner periphery of said flange defining said port of said connector body;
   (iv) a ring-shaped spacer mounted within said retainer tube and held against said distal end face of said auxiliary cylindrical member remote from said main cylindrical member, said convex lens being mounted within said retainer tube and held between and supported by said spacer and said flange of said retainer tube, so that the illumination light passes through the convex lens and is incident upon the light-receiving surface of the light guide means.

5. An endoscope system according to cliam 4, in which said convexed lens is a spherical lens, said flange and said spacer respectively having semi-spherical seats held in contact with said spherical lens to support the same.

6. An endoscope system according to claim 4, in which a tapered surface is formed on an outward portion of an inner peripheral of said flange remote from said spacer, said tapered surface increasing in diameter progressively in a direction away from said spacer.

7. An endoscope system according to claim 4, in which the proximal end portion of said auxiliary cylindrical member is inserted into and fixed to the distal end portion of said main cylindrical member, said retainer tube being the same in outer diameter as said main cylindrical member, a proximal end face of said retainer tube being held against a distal end face of said main cylindrical member.

8. An endoscope system according to claim 1, wherein said connector body has a radially inwardly-directed flange formed on a distal end thereof and a ring-shaped spacer mounted within said connector body, said flange having a tapered surface formed on an outward portion of an inner periphery of said flange remote from said spacer, said tapered surface increasing in diameter progressively in a direction away from said spacer.

9. An endoscope system according to claim 1, wherein said light source comprises a lamp and a concave mirror for reflecting and converging the illumination light generated from said lamp.

10. An endoscope system according to claim 1, wherein a convergent point into which the illumination light going from said convex lens converges is disposed in the light guide means so that illumination light converges from said convex lens through the light-receiving surface of the light guide means toward the convergent point.

* * * * *